United States Patent
Shah et al.

(10) Patent No.: US 7,113,899 B2
(45) Date of Patent: Sep. 26, 2006

(54) METHOD AND SYSTEM FOR DESIGNING AN ELECTRIC MACHINE STATOR INCLUDING KEYBARS

(75) Inventors: Manoj Ramprasad Shah, Latham, NY (US); Sameh Ramadan Salem, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 751 days.

(21) Appl. No.: 09/681,571

(22) Filed: May 1, 2001

(65) Prior Publication Data

US 2002/0163271 A1 Nov. 7, 2002

(51) Int. Cl.
G06G 7/48 (2006.01)
G06F 17/50 (2006.01)
H02K 1/00 (2006.01)
H02K 1/12 (2006.01)
H02K 15/14 (2006.01)

(52) U.S. Cl. .............................. 703/13; 703/7; 310/179; 310/217; 310/254; 29/596

(58) Field of Classification Search .................. 703/13, 703/7; 310/179, 217, 254; 29/596
See application file for complete search history.

(56) References Cited

U.S. PATENT DOCUMENTS

| 3,652,889 | A | | 3/1972 | Reece et al. |
| 3,987,325 | A | | 10/1976 | Wilson et al. |
| 4,564,779 | A | | 1/1986 | Terry, Jr. |
| 4,837,471 | A | * | 6/1989 | Kostoss et al. ............... 310/89 |
| 4,916,803 | A | | 4/1990 | Estrada |
| 6,104,116 | A | * | 8/2000 | Fuller et al. ................ 310/217 |
| 6,429,567 | B1 | * | 8/2002 | Shah et al. .................. 310/197 |
| 6,499,002 | B1 | * | 12/2002 | Lancaster ................... 702/191 |
| 6,720,699 | B1 | * | 4/2004 | Shah et al. .................. 310/197 |
| 2002/0079782 | A1 | * | 6/2002 | Shah et al. .................. 310/258 |
| 2002/0163271 | A1 | * | 11/2002 | Shah et al. ............ 310/156.57 |
| 2004/0080230 | A1 | * | 4/2004 | Shah et al. .................. 310/179 |

FOREIGN PATENT DOCUMENTS

| EP | 1255342 A2 * | 11/2002 |
| JP | 57078334 | 5/1982 |

OTHER PUBLICATIONS

Ito, H. et al. "Dynamic Characteristics and design technology of Turbine Generator Stator Frame." IEEE Transactions on Energy Conversion. Jun. 1988. vol. 3, Issue 2, pp. 420-426.*
Radatz, J. et al. The IEEE Standard Dictionary of Electrical and Electronics Terms. 6th Ed. IEEE Std. 100-1996. 1996. ISBN 1-55937-833-6. pp. 46, 230, 415, 565, 566, 765, 936, 1044.*
Jones, G.R. et al. Electrical Engineer's Reference Book. 15th Ed. 1993. Chapter 20.*

(Continued)

Primary Examiner—Paul L Rodriguez
Assistant Examiner—Ayal Sharon
(74) Attorney, Agent, or Firm—Ann M. Agosti; Patrick K. Patnode

(57) ABSTRACT

Keybar voltages in electric machines are reduced by electromagnetically optimizing the positioning of the keybars with respect to stator winding phase belts, the selection of the number of keybars, the selection of the number of stator slots, and/or the direction of rotation of a rotor with respect to the stator.

18 Claims, 3 Drawing Sheets

OTHER PUBLICATIONS

Cai, W. et al. "Resonant Frequencies and Mode Shapes of Switched Reluctance Motors." IEEE Transactions on Energy Conversion. Mar. 2001. vol. 16, Issue 1, pp. 43-48.*

Rafajlovski, G. et al. "Digital Simulation of Field Oriented Control Using ANSIM Program." 8th Mediterranean Electromechanical Conference, 1996. (MELECON '96). May 13-16, 1996. vol. 3, pp. 1223-1226.*

Bennington, B.J. "Man-Machine Interaction in the Design of Rotating Electrical Machines." Proc. of the 6th Annual DAC. 1969. pp. 45-59.*

Perkins, K. et al. "Special Problems in the Installation of Large Electrical Machines", Power Engineering Journal, Jan. 1992. vol. 6, Issue 1, pp. 21-31.*

Gieras, J. et al., "Calculation of Synchronous Reactances of Small Permanent-Magnet Alternating-Current Motors: Comparison of Analytical Approach and Finite Element Method with Measurements." IEEE Transactions on Magnetics, Sep. 1998, vol. 34, No. 5, p.*

Hansen, C. "The AC Power Line and Audio Equipment". audioXpress, 1991. Issue 10, pp. 66-73.*

Nandi, S. et al. "Fault Diagnosis of Electrical Machines—A Review." Int'l Conf. IEMD '99. May 1999. pp. 219-221.*

Osama, M. et al. "Modeling and Analysis of a Wide-Speed-Range Induction Motor Drive Based on Electronic Pole Changing." IEEE Transactions on Industry Applications. Oct. 1997. Vo.33, No. 5, pp. 1177-1184.*

Kerszenbaum, I. "Shaft Currents in Electric Machines Fed by Solid-State Drives." IEEE Conf. of Industrial and COmmercial Power Systems. May 1992. pp. 71-79.*

Nandi, S. et al. "Performance Analysis of a Single Phase Induction Motor Under Eccentric Conditions." IEEE IAS '97 Conf. Oct. 1997. vol. 1, pp. 174-181.*

Pillay, P. et al. "Labview Implementation of Speed Detection for Mains-Fed Motors Using Motor CUrrent Signature Analysis." IEEE Power Engineering Review. Jun. 1998. vol. 18, Issue 6, pp. 47-48.*

Arshad, W. et al. "Investigating Manufacturing Defects in a Linear Transverse-Flux Machine for a Free-Piston Generator." Undated. http://eme.ekc.kth.se/publications/pdf/2003/waqas-jens-alija-peter-mats-birmingham2003.pdf.*

Infolytica Corporation. FastTrack Reference Manual for MagNet 52. © 1996.*

Durantay, L. et al. "Large Band Reduction of Magnetic Vibrations of Induction Machines with "Breaking of Impedence" Interface." Int'l Conf. of Electric Machines and Drives (IEMD '99). May 9-12, 1999. pp. 475-477.*

Jang, G.H. et al. "The Effect of Magnet Geometry on Electric Motor Vibration." IEEE Transactions on Magnetics. Jun. 18-21, 1991. vol. 27, Issue 6, pp. 5202-5204.*

Fahimi, B. et al. "Design Considerations of Switched Reluctance Motors: Vibration Control Issues". Conf. Record of the 1999 IEEE 34th IAS Annual Meeting. Oct. 3-7, 1999. vol. 4, pp. 2259-2266.*

A Copy of The EPO Search Report Dated Dec. 2, 2004 is Enclosed.

* cited by examiner

METHOD AND SYSTEM FOR DESIGNING AN ELECTRIC MACHINE STATOR INCLUDING KEYBARS

BACKGROUND OF INVENTION

The invention relates generally to electric machine stators.

Stators of large electric machines, especially generators, are typically built with a standard number of keybars and two flanges. One flange is positioned at each end to mechanically couple the keybars and support the stator. The number of the keybars and sizes of the keybars and the flanges are designed mainly for meeting mechanical requirements of the stator.

For mechanical stability, keybars generally comprise magnetic or non-magnetic steel or steel alloys. Such materials are electrically conductive. Due to the keybars being situated in the vicinity of magnetic fields and being electrically conductive, adverse electromagnetic effects result and limit electric machine rating and performance.

Keybar voltage restricts the stator yoke (back iron) flux density. The main cause of keybar voltage is leakage flux that spills behind the stator core outer surface. If electromagnetic effects of the keybars can be reduced, electrical design engineers would have more freedom and fewer restrictions to further optimize the machine and thus be able to reduce the machine cost without sacrificing efficiency and reliability in a safe manner.

It would therefore be desirable to reduce keybar voltages in electric machines (and thus reduce adverse electromagnetic effects) without compromising the integrity of the electric machines.

SUMMARY OF INVENTION

Briefly, in accordance with one embodiment of the present invention, keybar voltages in electric machines are reduced by electromagnetically optimizing the positioning of the keybars with respect to stator (armature) winding phase belts, the selection of the number of keybars, the selection of the number of stator slots, and/or the direction of rotation of a rotor with respect to the stator.

BRIEF DESCRIPTION OF DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION

Figure 1:
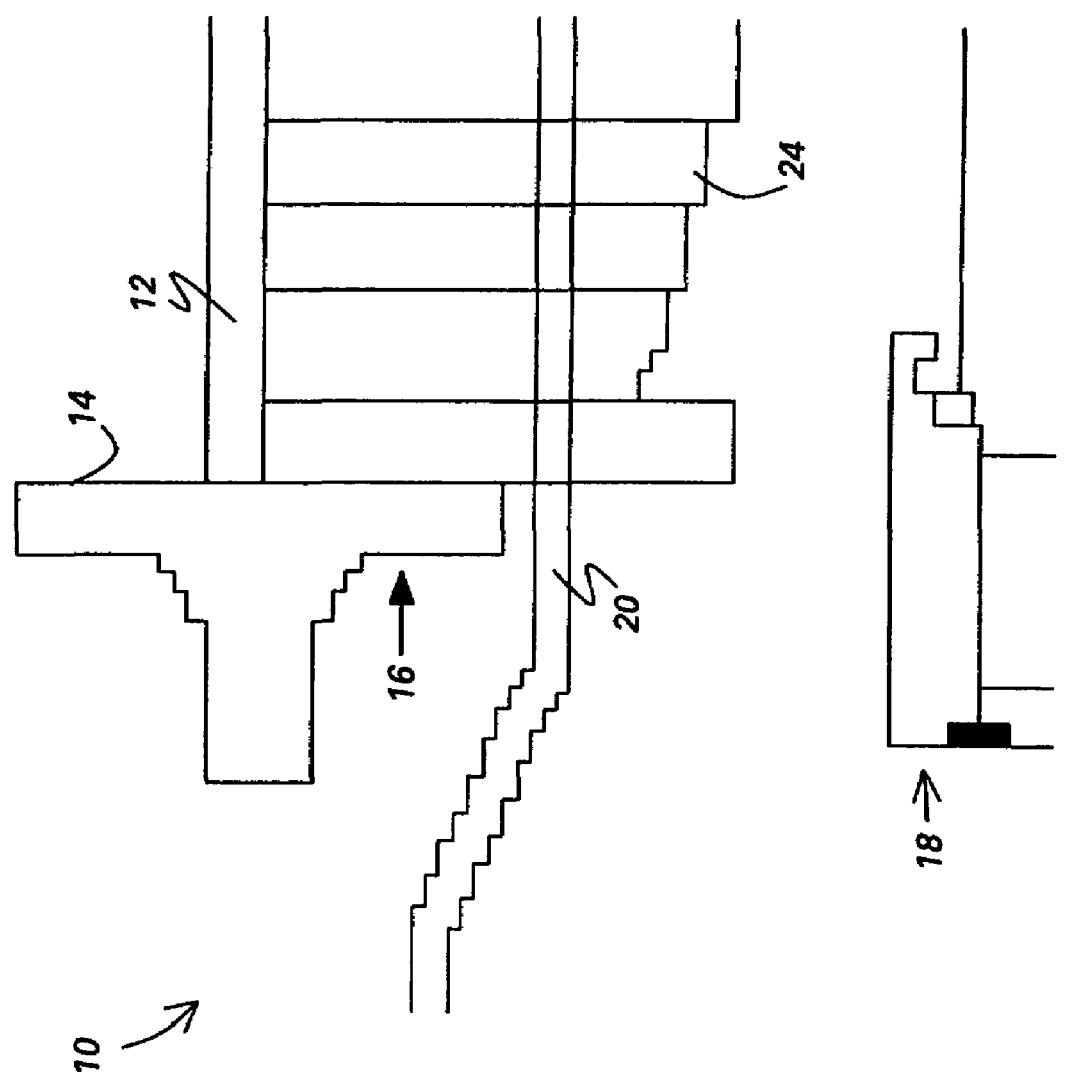
FIGS. 1 and 2 are side (radial-axial plane) and cross-sectional (radial-peripheral plane) views of a conventional electric machine with a keybar and flange system.
Figure 2:
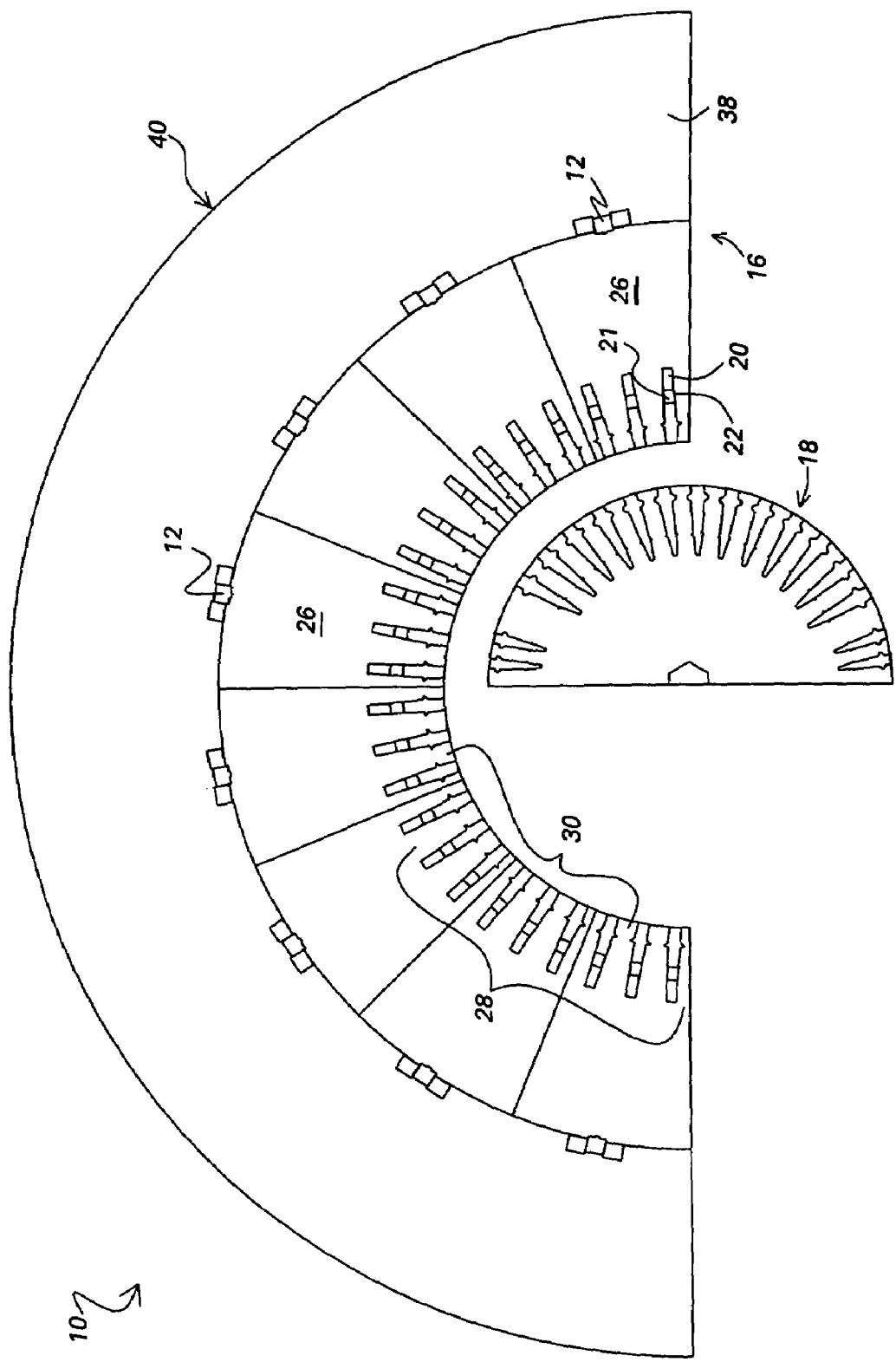

FIGS. 1 and 2 are side (radial-axial plane) and cross-sectional (radial-peripheral plane) views of a conventional electric machine 10 including a rotor 18 and a stator 16 including a stator flange 14, stator lamination 24 layer segments 26 (hereinafter referred to as "lamination segments") coupled to a stator frame 40 and section plates 38 by keybars 12, and stator winding 20 phase belts 28 and 30 within stator slots 22 of the lamination segments. In the embodiment of FIG. 2, phase belt 28 corresponds to a phase belt for outer winding layer 20, and phase belt 30 corresponds to a phase belt for inner winding layer 21.

The influence of the number of keybars, the stator winding phase belt span (dependent on the number of stator slots, the number of magnetic poles, and the number of phases), and relative locations on electromagnetic interactions (keybar voltages, for example) is complex, and operating point or load dependent. Conventional stator fabrication techniques and design methods have not contemplated or attempted to correlate these relations.

In one embodiment of the present invention, a method for designing stator 16 comprises determining electromagnetic effects of adjusting positions of the keybars with respect to positions of the phase belts, and selecting a position of the keybars with respect to a position of the phase belts which provides minimal adverse electromagnetic effects (meaning less adverse electromagnetic effects as compared with the other position(s)) from phenomena such as keybar voltage, for example.

The determination of the electromagnetic effects may be made by simulation in a computer (not shown) or by physical testing. In embodiments wherein computer simulation is selected, advanced analytical methods such as time stepping finite elements with rotation permit a designer to quantitatively determine the subtle effects of relative locations of the keybars with respect to the phase belts on keybar voltages for a given load. The designer can then choose the positioning that minimizes the keybar voltages with the result being an optimized and more reliable machine design. "Designing" may occur either before the stator is fabricated or in a retrofit environment. If it is determined by using an embodiment of the present invention that another position of the phase belts would be advantageous, connections to the stator winding layers can be shifted accordingly.

This embodiment can be used to reduce keybar voltages without the need for any physical changes in the machine and hence will have no adverse impact on all other design considerations. Also, by reducing the keybar voltages, this embodiment reduces the keybar currents through threaded and surface contacts between the keybars and the flanges, both electrically high resistance materials, and thus reduces the potential for arcing and pitting.

Figure 3:
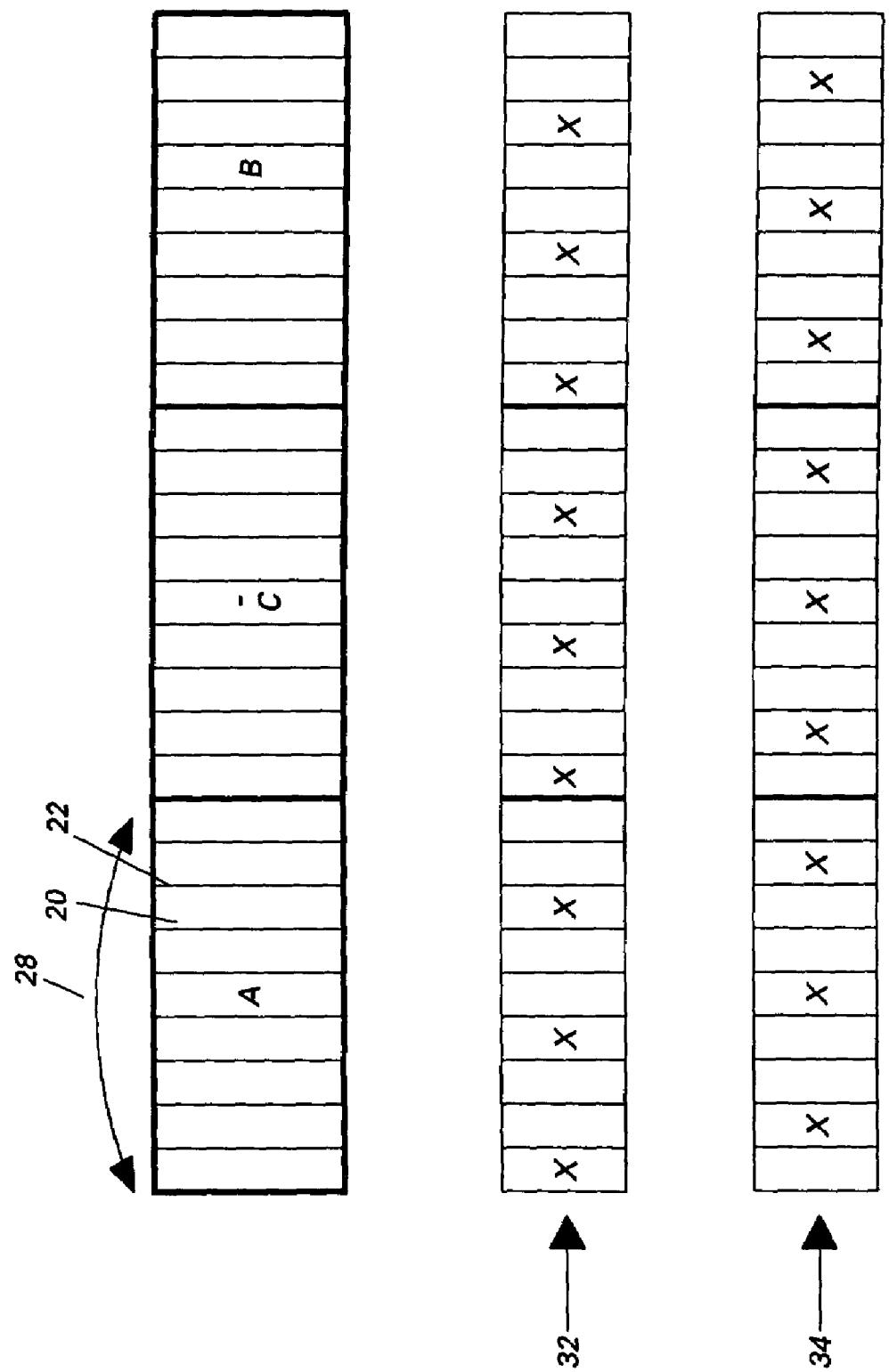
FIG. 3 is a block diagram illustrating an embodiment wherein alternative keybar positions are available.

FIG. 3 is a block diagram illustrating an embodiment wherein alternative keybar positions are available. For simplicity of illustration, the stator slots 22 are shown in linear form rather than curved form, and only three of the six phase belts of the outer winding layer are illustrated.

The embodiment of FIG. 3 is for a two pole electric machine with 54 stator slots. The number of stator slots 22 per phase belt 28 can be calculated by dividing the number of stator slots by the number of phases and by the number of poles. In other words, for a three phase two pole 54 stator slot machine, the number of stator slots per phase belt is 9 (54/(3*2)). The number of lamination segments 26 (and corresponding keybars 12 shown in FIG. 2) is generally an industry standard for conventional manufacturing techniques. Machines with 54 stator slots, for example, typically comprise 18 lamination segments and 18 keybars. Thus, there is one keybar for every three stator slots (54/18=3).

As can be seen in FIG. 3, two different keybar position options 32 and 34 (represented by x's) result. In a first option 32, keybars are positioned to be in alignment with the first, fourth, and seventh stator slots of each phase belt 28. In a second option 34, keybars are positioned to be in alignment with the second, fifth, and eight stator slots of each phase belt.

In some electric machines with predefined numbers of stator slots and keybars, the keybars are balanced such that changing position of the keybars is not expected to have a change in the electromagnetic effect. In other words, there may not exist any alternate relative positions for keybars with respect to the stator phase belts.

For new machines or machines where there is some flexibility, another embodiment of the present invention is to determine electromagnetic effects of adjusting the number of keybars and to select a number of the keybars which provides minimal adverse electromagnetic effects. This keybar number embodiment may be used separately from or in conjunction with the above-discussed keybar position embodiment.

In one example, some stators having 42 stator slots use 14 lamination segments whereas others use 21 lamination segments. The two alternatives can be compared to determine electromagnetic effects and arrive at a preferred design provided that other design aspects are not compromised.

In still another embodiment, which may be used separately or in combination with either or both of the above embodiments, electromagnetic effects are determined based on the number of stator slots (or, in other words, the stator phase belt span), and the number of the stator slots is selected which provides minimal adverse electromagnetic effects.

In any of the above embodiments, it is to be understood that non-electromagnetic restrictions many affect the overall machine design. For example, for a given generator, the largest lamination segment that can be stamped would put a lower limit on the number of keybars.

Another factor which can be used in evaluating design options is whether changing the direction of rotation of a rotor in the resulting machine results in different electromagnetic effects. One reason such effects might differ is that phase belts 28 and 30 of outer and inner winding layers 20 and 21 are typically offset as can be seen in FIG. 1, for example, which illustrates "short pitching" the stator winding layers to reduce harmonics. In this embodiment, a method for operating electric machine 10 of FIG. 1 comprises selecting a direction of rotation of rotor 18 which provides minimal adverse electromagnetic effects on the keybars 12.

When multiple embodiments are used in combination, a particular machine can be designed by evaluating physical constraints and reviewing options to arrive at a design which collectively minimizes electromagnetic effects.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for designing a stator for an electric machine comprising lamination segments coupled to a stator frame by keybars and stator winding phase belts within stator slots of the lamination segments, the method comprising:
   determining effects on at least one of keybar voltage or keybar current of adjusting positions of the keybars with respect to positions of the phase belts; and
   selecting a position of the keybars with respect to a position of the phase belts which provides minimal keybar voltage.

2. The method of claim 1 further comprising determining effects of adjusting the number of keybars, and wherein selecting the position of the keybars comprises selecting both the position of the keybars and a number of the keybars to provide minimal keybar voltage.

3. The method of claim 1 further comprising determining effects of adjusting the number of stator slots, and wherein selecting the position of the keybars comprises selecting both the position of the keybars and a number of the stator slots to provide minimal keybar voltage.

4. The method of claim 1 further comprising determining effects of adjusting a direction of rotation of a rotor with respect to the stator, and wherein selecting the position of the keybars comprises selecting both the position of the keybars and a direction of rotation to provide minimal keybar voltage.

5. A method for designing a stator for an electric machine comprising lamination segments coupled to a stator frame by keybars and stator winding phase belts within stator slots of the lamination segments, the method comprising:
   determining effects on at least one of keybar voltage or keybar current of adjusting positions of the keybars with respect to positions of the phase belts, adjusting the number of keybars, and adjusting the number of stator slots; and
   selecting a position of the keybars with respect to a position of the phase belts, a number of the keybars, and a number of stator slots which collectively provide minimal keybar voltage.

6. The method of claim 5 further comprising determining effects of adjusting a direction of rotation of a rotor with respect to the stator, and selecting a direction of rotation to provide minimal keybar voltage.

7. A method for designing a stator for an electric machine comprising lamination segments coupled to a stator frame by keybars and stator winding phase belts within stator slots of the lamination segments, the method comprising:
   determining effects on at least one of keybar voltage or keybar current of adjusting the number of keybars; and
   selecting a number of the keybars which provides minimal keybar voltage.

8. The method of claim 7 further comprising determining effects of adjusting the number of stator slots, and wherein selecting the number of the keybars comprises selecting both the number of the keybars and a number of the stator slots to provide minimal keybar voltage.

9. A method for designing a stator for an electric machine comprising lamination segments coupled to a stator frame by keybars and stator winding phase belts within stator slots of the lamination segments, the method comprising:
   determining effects on at least one of keybar voltage or keybar current of adjusting the number of stator slots; and
   selecting a number of the stator slots which provides minimal keybar voltage.

10. A method for operating an electric machine comprising a rotor and a stator comprising lamination segments coupled to a stator frame by keybars and stator winding phase belts within stator slots of the lamination segments, the method comprising selecting a direction of rotation of the rotor which provides minimal keybar voltage.

11. A system for designing a stator for an electric machine comprising lamination segments coupled to a stator frame by keybars and stator winding phase belts within stator slots of the lamination segments, the system comprising:

means for determining effects on at least one of keybar voltage or keybar current of adjusting positions of the keybars with respect to positions of the phase belts; and means for selecting a position of the keybars with respect to a position of the phase belts which provides minimal keybar voltage.

12. The system of claim 10 wherein the means for determining and the means for selecting comprise a computer.

13. A system for designing a stator for an electric machine comprising lamination segments coupled to a stator frame by keybars and stator winding phase belts within stator slots of the lamination segments, the system comprising:

means for determining effects on at least one of keybar voltage or keybar current of adjusting positions of the keybars with respect to positions of the phase belts, adjusting the number of keybars, and adjusting the number of stator slots; and means for selecting a position of the keybars with respect to a position of the phase belts, a number of the keybars, and a number of stator slots which collectively provides minimal keybar voltage.

14. A system for designing a stator for an electric machine comprising lamination segments coupled to a stator frame by keybars and stator winding phase belts with in stator slots of the lamination segments, the system comprising:

means for determining effects on at least one of keybar voltage or keybar current of adjusting the number of keybars; and means for selecting a number of the keybars which provides minimal keybar voltage.

15. A system for designing a stator for an electric machine comprising lamination segments coupled to a stator frame by keybars and stator winding phase belts within stator slots of the lamination segments, the system comprising:

means for determining effects on at least one of keybar voltage or keybar current of adjusting the number of stator slots; and means for selecting a number of the stator slots which provides minimal keybar voltage.

16. A system for designing a stator for an electric machine comprising lamination segments coupled to a stator frame by keybars and stator winding phase belts within stator slots of the lamination segments, the system comprising a computer for performing simulations to determine effects on at least one of keybar voltage or keybar current of adjusting positions of the keybars with respect to positions of the phase belts.

17. A system for designing a stator for an electric machine comprising lamination segments coupled to a stator frame by keybars and stator winding phase belts within stator slots of the lamination segments, the system comprising a computer for performing simulations to determine effects on at least one of keybar voltage or keybar current of adjusting positions of the keybars with respect to positions of the phase belts, adjusting the number of keybars, and adjusting the number of stator slots.

18. The method of claim 1 wherein determining effects on at least one of keybar voltage or keybar current of adjusting positions of the keybars with respect to positions of the phase belts comprises physical testing.

* * * * *